United States Patent
Chubun et al.

(10) Patent No.: US 12,451,319 B2
(45) Date of Patent: Oct. 21, 2025

(54) ELECTRON SOURCE WITH MAGNETIC SUPPRESSOR ELECTRODE

(71) Applicant: KLA Corporation, Milpitas, CA (US)

(72) Inventors: Nikolai Chubun, Palo Alto, CA (US); Xinrong Jiang, Palo Alto, CA (US); Youfei Jiang, Milpitas, CA (US); Christopher Sears, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/135,279

(22) Filed: Dec. 28, 2020

(65) Prior Publication Data
US 2022/0108862 A1  Apr. 7, 2022

Related U.S. Application Data

(60) Provisional application No. 63/087,312, filed on Oct. 5, 2020.

(51) Int. Cl.
| | | |
|---|---|---|
| *H01J 37/063* | (2006.01) | |
| *H01J 37/09* | (2006.01) | |
| *H01J 37/14* | (2006.01) | |
| *H01J 37/32* | (2006.01) | |

(52) U.S. Cl.
CPC ............ *H01J 37/063* (2013.01); *H01J 37/09* (2013.01); *H01J 37/14* (2013.01); *H01J 37/3255* (2013.01)

(58) Field of Classification Search
CPC ........ H01J 37/06; H01J 37/063; H01J 37/065; H01J 37/09; H01J 37/14; H01J 37/3255
See application file for complete search history.

(56) References Cited

U.S. PATENT DOCUMENTS

| | | | |
|---|---|---|---|
| 4,315,152 A * | 2/1982 | Smith ................. | H01J 37/06 250/398 |
| 5,041,732 A * | 8/1991 | Saito ................... | H01J 37/073 250/396 ML |
| 6,392,333 B1 | 5/2002 | Veneklasen et al. | |
| 6,946,654 B2 | 9/2005 | Gerlach et al. | |
| (Continued) | | | |

FOREIGN PATENT DOCUMENTS

| | | |
|---|---|---|
| EP | 1401007 B1 | 6/2005 |
| JP | 2000285839 A * | 10/2000 |
| (Continued) | | |

OTHER PUBLICATIONS

Pikin, Alexander et al., "Analysis of magnetically immersed electron guns with non-adiabatic fields", Review of Scientific Instruments, 87, Issue 11 (published Nov. 18, 2016).

(Continued)

*Primary Examiner* — David E Smith
(74) *Attorney, Agent, or Firm* — Suiter Swantz IP (57) ABSTRACT

An electron source is disclosed. The electron source may include an electron emitter configured to generate one or more electron beams. The electron source may further include a magnetic suppressor electrode surrounding at least a portion of the electron emitter. The magnetic suppressor electrode may be formed from one or more magnetic materials. The magnetic suppressor may be configured to shield at least a portion of the electron emitter from an axial magnetic field. The electron source may further include an extractor electrode positioned adjacent to a tip of the electron emitter.

12 Claims, 8 Drawing Sheets

(56) References Cited

U.S. PATENT DOCUMENTS

| | | | |
|---|---|---|---|
| 7,573,046 B1 | 8/2009 | Chubun | |
| 7,821,187 B1 * | 10/2010 | Jiang | H01J 37/063 |
| | | | 313/425 |
| 8,314,401 B2 | 11/2012 | Zhang et al. | |
| 9,305,741 B2 | 4/2016 | Chang et al. | |
| 9,437,395 B2 | 9/2016 | Li | |
| 9,934,933 B1 | 4/2018 | Hordon et al. | |
| 10,242,839 B2 | 3/2019 | Brodie | |
| 2007/0057617 A1 | 3/2007 | Coyle et al. | |
| 2010/0019648 A1 * | 1/2010 | Yasuda | B82Y 40/00 |
| | | | 313/412 |
| 2014/0326879 A1 | 11/2014 | Fukuda et al. | |
| 2016/0163500 A1 * | 6/2016 | Li | H01J 37/28 |
| | | | 313/153 |
| 2019/0378705 A1 | 12/2019 | Jiang et al. | |
| 2020/0126753 A1 | 4/2020 | Li | |

FOREIGN PATENT DOCUMENTS

| | | |
|---|---|---|
| JP | 5337083 B2 | 11/2013 |
| TW | 201832265 A | 9/2018 |
| WO | 2000052733 A1 | 9/2000 |
| WO | 2005124815 A1 | 12/2005 |

OTHER PUBLICATIONS

Saito, Kenichi et al., "New design for a field emission electron gun immersed in a magnetic lens field", Proc. SPIE, 2522, published Sep. 25, 1995.

PCT International Search Report and Written Opinion for International Application No. PCT/US2021/051385 dated Jan. 10, 2022, 8 pages.

Taiwan Patent Office, Office Action received in TW Application No. 110136646, Feb. 13, 2025, 11 pages (with translation).

* cited by examiner

ELECTRON SOURCE WITH MAGNETIC SUPPRESSOR ELECTRODE

CROSS-REFERENCE TO RELATED APPLICATION

The present application claims benefit under 35 U.S.C. § 119(e) and constitutes a regular (non-provisional) patent application of U.S. Provisional Application Ser. No. 63/087,312, filed Oct. 5, 2020, entitled ELECTRON GUN WITH MAGNETIC IMMERSION, naming Nikolai Chubun, Xinrong Jiang, Youfei Jiang, and Christopher Sears as inventors, which is incorporated herein by reference in the entirety.

TECHNICAL FIELD

The present invention generally relates to electron sources for electron beam inspection systems and, in particular, an electron source including a magnetic suppresser electrode for an electron beam inspection system.

BACKGROUND

Electron beam inspection systems have become powerful tools for material characterization. Electron beam inspection systems use electrons from electron sources for imaging a sample. Electrons are emitted from the end point of needle-like metal wires, which are often heated to help induce the electron emission. Current electron sources include an electrostatic suppressor electrode and an extractor electrode immersed in axial magnetic fields. For a smooth magnetic field structure, both of the electrodes are made of non-magnetic materials. However, the current electron sources exhibit emitter drift over time, which requires the electron optics to be calibrated for tip position and once the position is changed by more than a few microns recalibration is needed. This interrupts tool operation and wastes tool time.

SUMMARY

An electron source is disclosed, in accordance with one or more embodiments of the present disclosure. In one embodiment, the electron source includes an electron emitter configured to generate one or more electron beams. In another embodiment, the electron source includes a magnetic suppressor electrode surrounding at least a portion of the electron emitter, the magnetic suppressor electrode being formed from one or more magnetic materials, the magnetic suppressor being configured to shield at least a portion of the electron emitter from an axial magnetic field. In another embodiment, the electron source includes an extractor electrode positioned adjacent to a tip of the electron emitter.

An electron beam inspection system is disclosed, in accordance with one or more embodiments of the present disclosure. In one embodiment, the system includes an electron source. In another embodiment, the electron source of the system includes an electron emitter configured to generate one or more electron beams. In another embodiment, the electron source of the system includes a magnetic suppressor electrode surrounding at least a portion of the electron emitter, the magnetic suppressor electrode being formed from one or more magnetic materials, the magnetic suppressor being configured to shield the electron emitter from an axial magnetic field. In another embodiment, the electron source of the system includes an extractor electrode positioned adjacent to a tip of the electron emitter. In another embodiment, the system includes an electron-optical column including a set of electron-optical elements configured to direct the electron beam onto a sample, the set of electron-optical elements including at least a magnetic lens.

A method is disclosed, in accordance with one or more embodiments of the present disclosure. In one embodiment, the method includes emitting a particle beam from a tip of an electron emitter, the electron emitter being at least partially surrounded by a magnetic suppressor electrode. In another embodiment, the method includes shielding a magnetic field of the electron emitter with the magnetic suppressor electrode.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Electron beam inspection systems have become powerful systems for material characterization. Electron beam inspection systems use electrons from electron sources for imaging a sample. Electrons are emitted from the end point of needle-like metal wires, which are often heated to help induce the electron emission. In current electron sources an electrostatic suppressor (e.g., a non-magnetic suppressor formed from materials such as Molybdenum, Titanium, Tungsten) may be used to reject the emission of electrons from the tip shaft. However, the tip and the tip shaft may be exposed to EMI, which causes shifts or vibrations. Due to the shift (or emitter drift), the electron optics within the inspection system must be calibrated based on the position of the emitter tip. Once changed, the inspection system must be re-calibrated. This interrupts tool operation and wastes time. Further, in these current systems, emitter tip drift is often observed to be unidirectional and over time the tip may run out of displacement budget. The reason for displacement is that the magnetic force of axial magnetic field and heating filament current. This force and high temperature of filament results in a slow bending of the Tungsten wire, causing material creeping.

Embodiments of the present disclosure are directed to an electron source including a magnetic suppressor electrode for an electron beam inspection system. In particular, embodiments of the present disclosure are directed to a magnetic suppressor formed of one or more ferromagnetic materials. Additionally, embodiments of the present disclosure are directed to an electron beam inspection system including a magnetic lens positioned a select distance from the emitter tip of the electron source, such that the magnetic field (e.g., B-field) is moved closer to the tip in order to narrow the working distance and reduce spherical/chromatic aberration coefficients.

Figure 1:
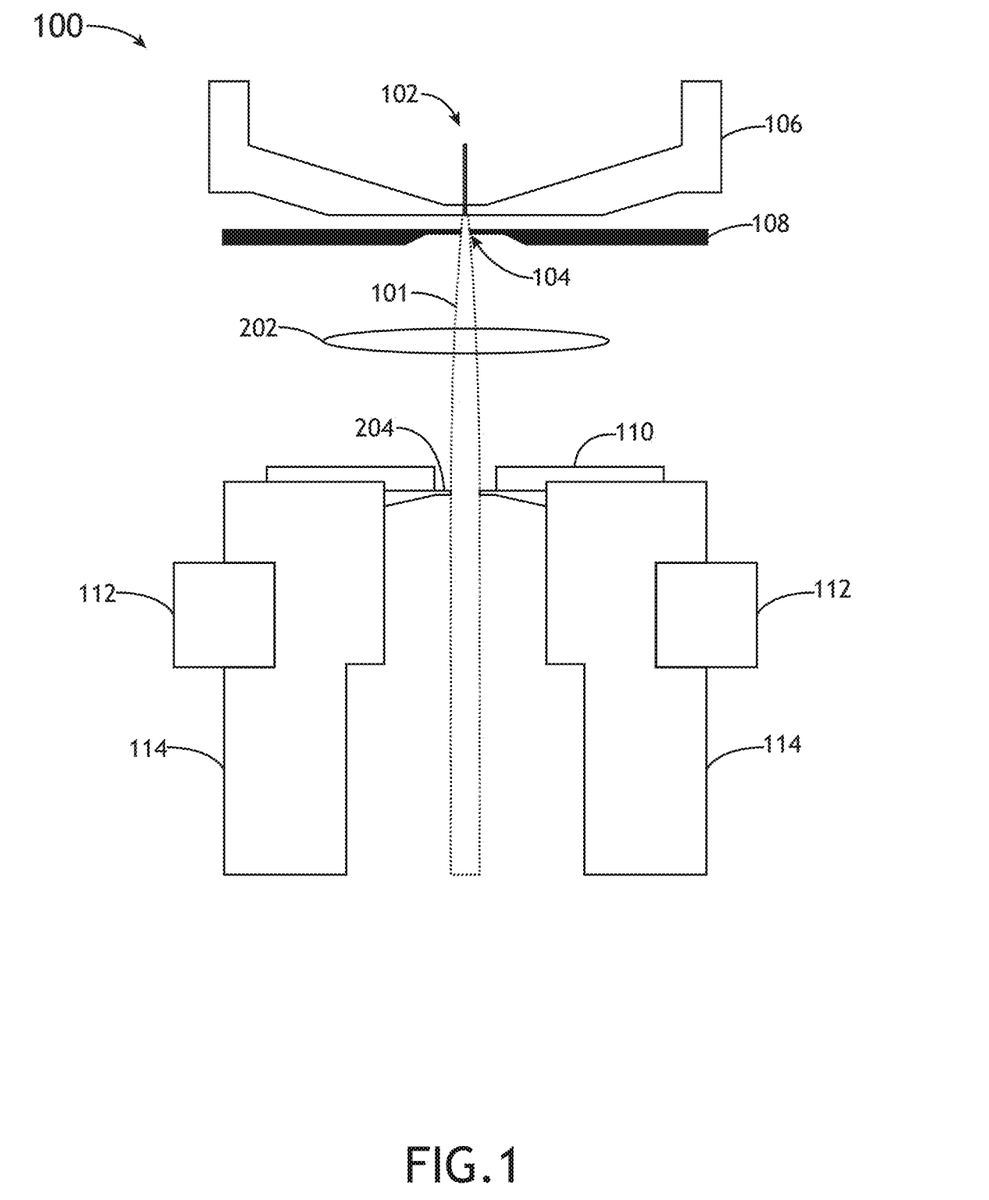
FIG. 1 illustrates a schematic view of an electron source, in accordance with one or more embodiments of the present disclosure.

FIG. 1 illustrates a simplified schematic view of an electron source 100, in accordance with one or more embodiments of the present disclosure.

In one embodiment, the electron source 100 includes an electron emitter 102 configured to generate one or more electron beams 101. The electron emitter 102 may include a tip 104.

The electron source 100 may include any electron emitter known in the art of electron emission. For example, the electron source 100 may include, but is not limited to, one or more field emission guns (FEGs). By way of another example, the one or more field emission guns may include, but are not limited to, a carbon nanotube emitter, a nanostructured carbon film emitter, a Muller-type emitter, a Spindt-type emitter, or a Schottky-type emitter.

The particle emission from the tip 104 of the electron emitter 102 may include any type of emission process known in the art. For example, the particle emission may include at least one of thermal electron emission, Schottky electron emission, extended-Schottky electron emission, cold field electron emission, photoemission, or the like.

In another embodiment, the electron source 100 includes a magnetic suppressor electrode 106 configured to surround at least a portion of the electron emitter 102. The magnetic suppressor electrode 106 may be at least partially formed of one or more magnetic materials. For example, the magnetic suppressor electrode 106 may be substantially (or entirely) formed from one or more magnetic materials. By way of another example, the magnetic suppressor electrode 106 may be partially formed from one or more magnetic materials.

The magnetic suppressor electrode 106 may be formed from any magnetic material. For example, the one or more magnetic materials may include one or more ferromagnetic materials, such that the magnetic suppressor electrode 106 may be at least partially formed from one or more ferromagnetic materials. In one instance, the magnetic suppressor electrode 106 may be substantially (or entirely) formed from one or more ferromagnetic materials. In another instance, the magnetic suppressor electrode 106 may be partially formed from one or more ferromagnetic materials. The one or more ferromagnetic materials may include a magnetic material including at least one of nickel (Ni), iron (Fe), cobalt (Co), or the like. For example, the one or more ferromagnetic materials may include, but are not limited to, carbon steel, nickel alloy, soft iron, or the like.

In another embodiment, the electron source 100 includes one or more extractor electrodes 108 positioned adjacent to the tip 104 of the electron emitter 102. During operation, the one or more extractor electrodes 108 may be configured to extract at least a portion of the electron beam 101 from the emitter 102 and transmit the electron beam 101 to an electron-optical column 206, which in turn directs the beam 101 to a sample 210. The one or more extractors 108 of the electron source 100 may include any electron beam extractor known in the art.

Figure 2:
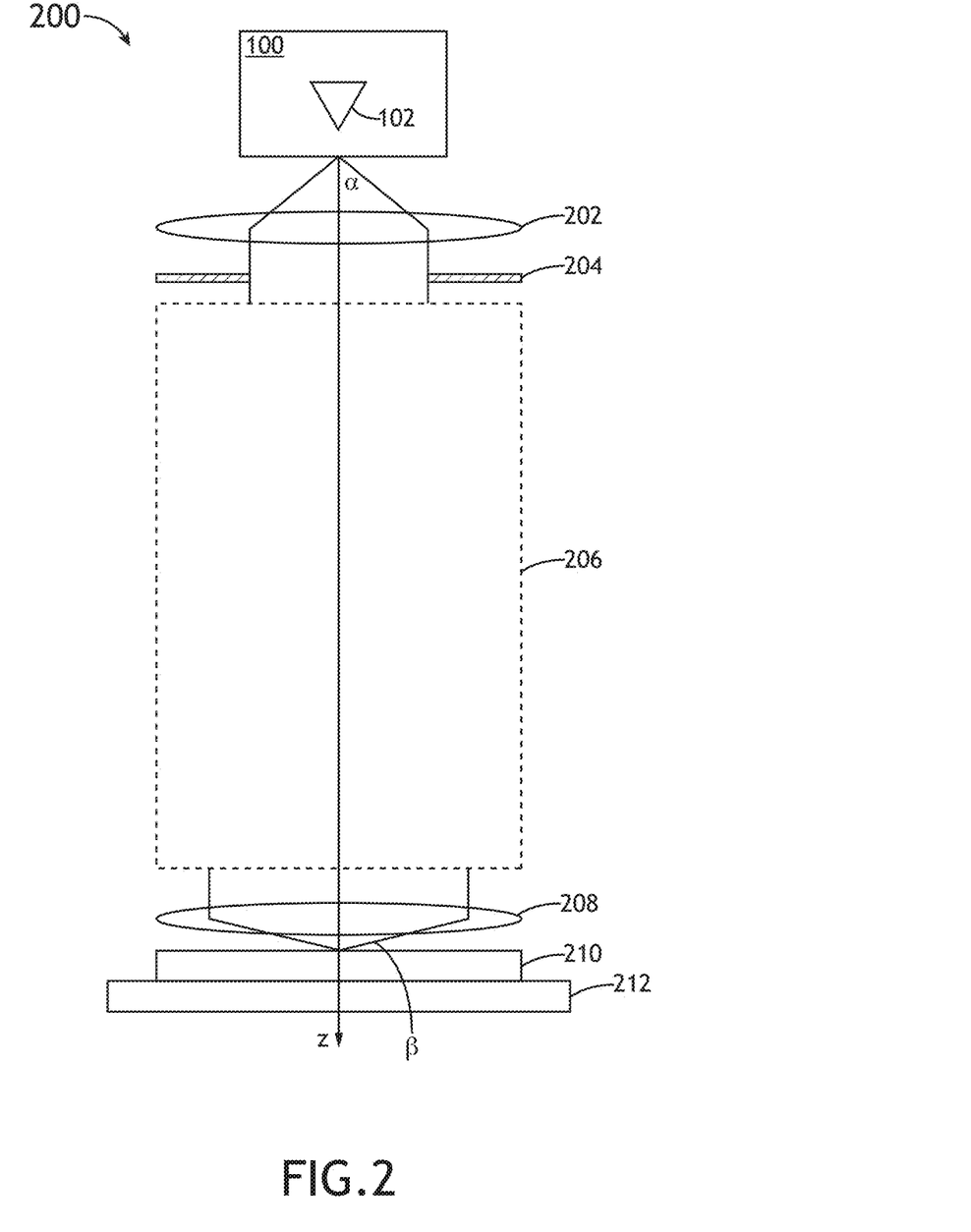
FIG. 2 illustrates a schematic view of an electron beam inspection system including the electron source, in accordance with one or more embodiments of the present disclosure.

FIG. 2 illustrates a high-level schematic view of an electron beam inspection system 200 including the electron source 100, in accordance with one or more embodiments of the present disclosure. It is noted herein that the various embodiments, components, and architecture described previously herein with regard to FIG. 1 should be interpreted to extend to the electron beam inspection system 200 of FIG. 2, unless noted otherwise.

In one embodiment, the system 200 includes an electron source. For example, the inspection system 200 may include the electron source 100, previously discussed herein and shown in FIG. 1. The electron source 100 of the system 200 may include the magnetic suppressor electrode 106 formed at least partially from one or more magnetic material (such as one or more ferromagnetic materials).

In another embodiment, the system 200 includes one or more magnetic lenses 202 (or magnetic gun lenses 202). The one or more magnetic lenses 202 may be configured to focus and/or deflect the one or more electron beams 101 using a magnetic force. The one or more magnetic lenses 202 may include any type of magnetic lens known in the art including, but not limited to, a quadrupole magnetic lens, sextupole magnetic lens, octupole magnetic lens, or the like. Further, the one or more magnetic lenses 202 may have any magnetic force strength known in the art suitable for reducing spherical and chromatic aberrations coefficients of the system 200.

In another embodiment, the system 200 includes one or more beam limiting apertures 204 (BLA 204). Referring to FIG. 1, the one or more BLAs 204 may be positioned near an anode 110 of the system 200 (as shown in FIG. 1). The anode 110 may be positioned above one or more pole pieces 112. The one or more beam limiting apertures 204 may be positioned within the system 200 using one or more BLA holders 114.

Figure 3A:
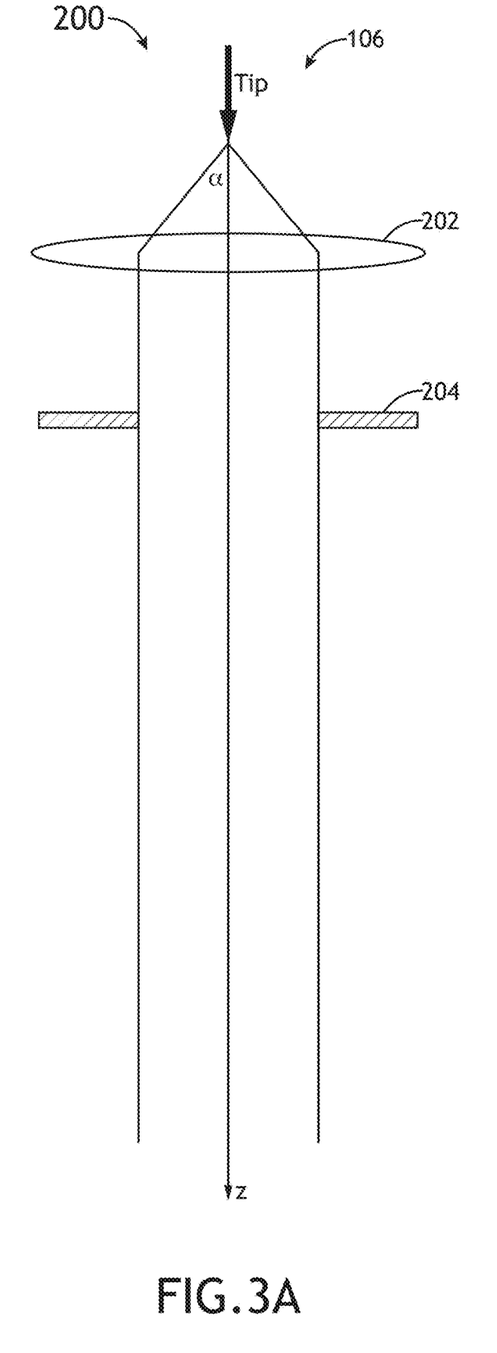
FIG. 3A illustrates a simplified schematic view of an electron beam column of the electron beam inspection system, in accordance with one or more embodiments of the present disclosure.
Figure 3B:
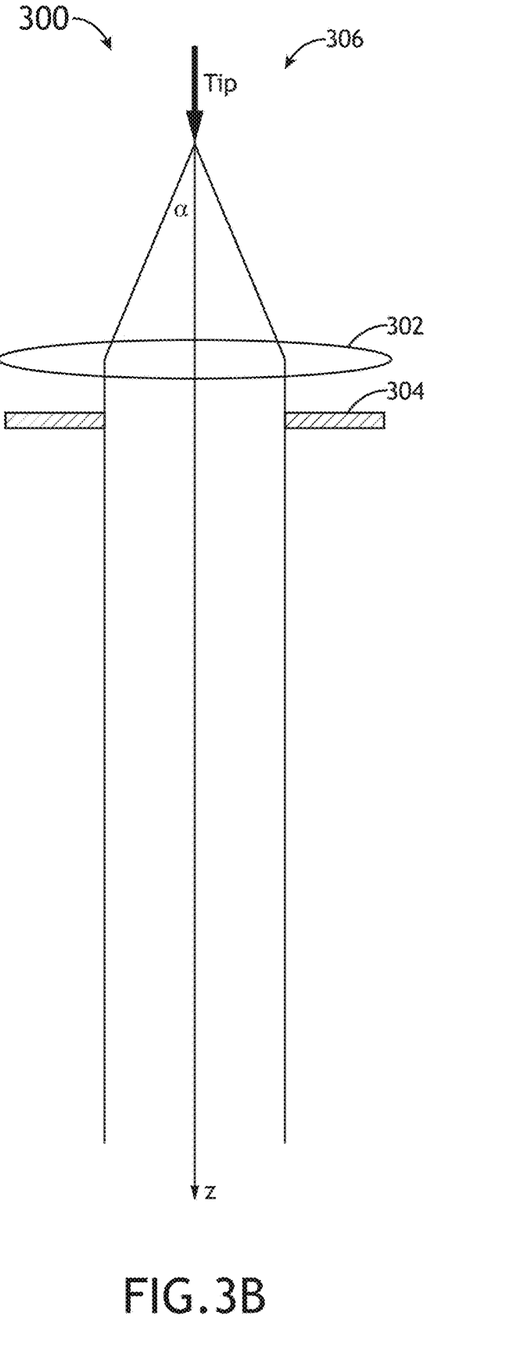
FIG. 3B illustrates a simplified schematic view of an electron beam column of a conventional electron beam inspection system.

FIGS. 3A-3B illustrate a simplified schematic view of an electron beam system 200 with a magnetic suppressor 106 and an electron beam system 300 with an electrostatic suppressor 306, in accordance with one or more embodiments of the present disclosure. In particular, FIG. 3A illustrates the system 200 including the electron source 100 with the magnetic suppressor electrode 106 (as shown in FIG. 1). In particular, FIG. 3B illustrates a system 300 including a conventional electron source with an electrostatic suppressor electrode 306.

As discussed previously herein, the magnetic lens may be configured to reduce the spherical and chromatic aberration coefficients. The spherical and chromatic aberration coefficients ($C_s$, $C_c$, respectively) are the function of the lens working distance (WD) for the tip side. The shorter the working distance, the lower the spherical and chromatic aberration coefficients will be. To narrow the working distance such that the spherical and chromatic aberration coefficients are reduced, the use of a magnetic suppressor electrode (e.g., the magnetic suppressor electrode 106) may be used to compress the magnetic lens B-field closer to the tip 104, such that the magnetic lens 202 of the system 200 is moved a select distance closer to the tip 104. For example, the magnetic lens 202 may be positioned less than 10 mm from the tip. For instance, the magnetic lens 202 may be positioned between 2-8 mm from the tip. In this regard, the magnetic lens 202 may be position approximately 5 mm from the tip.

In one embodiment, the one or more magnetic lenses 202 of the system 200 may be positioned a select distance from the tip 104 of the electron emitter 102, such that the one or more magnetic lenses 202 are positioned between the one or more extractor electrodes 108 and the anode 302 (near the BLA 204). Referring to FIGS. 3A-3B, the one or more magnetic lenses 202 of the system 200 may be positioned closer to the tip 104 than the magnetic lens 302 of the electrostatic system 300 (as shown in FIG. 3B). In system 300, the magnetic lens (or gun lens) is located between the extractor and anode (near the BLA 304), as shown in FIG. 3B.

Further, the one or more BLAs 204 of the system 200 may select a higher beam current than the BLAs 304 in the system 300. In this regard, the one or more BLAs 204 of the system 200 may have a lower magnetic lens excitation than the one or more BLAs 304 of the system 300.

Referring again to FIG. 2, in another embodiment, the system 200 includes an electron-optical column 206 for directing and/or focusing the electron beam 101 onto the sample 210 disposed on the sample stage 212.

In another embodiment, the electron-optical column 206 includes a set of electron-optical elements configured to direct the electron beam onto the sample 210. The set of electron-optical elements may include any combination of electron-optical elements known in the art. For example, the set of electron-optical elements may include one or more condenser lenses. By way of another example, the set of electron-optical elements may include one or more objective lenses 208. The one or more condenser lenses and one or more objective lenses may include any lens technology known in the art of electron-optics capable of shaping the electron beam 101 and/or the electron signal. By way of a further example, the set of electron-optical elements may include one or more beam deflector units (e.g., quadrupole deflectors or octupole deflectors).

The sample 210 may include any sample known in the art suitable for inspection/review with the electron beam inspection system 200. In one embodiment, the sample 210 includes a wafer. For example, the sample 210 may include, but is not limited to, a semiconductor wafer. As used through the present disclosure, the term "wafer" refers to a substrate formed of a semiconductor and/or a non-semi-conductor material. For instance, a semiconductor or semiconductor material may include, but is not limited to, monocrystalline silicon, gallium arsenide, and indium phosphide. In another embodiment, the sample includes a photomask. In another embodiment, the sample 210 includes a reticle. In another embodiment, the sample 210 emits and/or scatters electrons in response to the one or more electron beams 101.

In another embodiment, the system 200 includes a sample stage 212. In one embodiment, the sample stage 212 is an actuatable stage. For example, the sample stage 212 may include, but is not limited to, one or more translational stages suitable for selectively translating the sample 210 along one or more linear directions (e.g., x-direction, y-direction and/or z-direction). By way of another example, the sample stage 212 may include, but is not limited to, one or more rotational stages suitable for selectively rotating the sample 210 along a rotational direction. By way of another example, the sample stage 212 may include, but is not limited to, a rotational stage and a translational stage suitable for selectively translating the sample 210 along a linear direction and/or rotating the sample 210 along a rotational direction.

In another embodiment, the system 200 may further includes a detector assembly configured to detect an electron signal from the sample 210. The detector assembly may include any detector technology known in the art capable of detecting an electron signal from the sample 210 (e.g., secondary electrons and/or backscattered electrons). For example, a secondary electron detector may include an electron collector, which collects secondary electrons emitted by the surface of the sample 210. Further, the electron detector assembly may include a detector for detecting the secondary electrons. For instance, the electron detector assembly may include, but is not limited to, an Everhart-Thornley detector. By way of another example, the detector element may include, but is not limited to, a scintillating element and photomultiplier tube (PMT) detector. In another embodiment, the detector assembly may include one or more of micro-channel plate (MCP), a PIN or p-n junction detector, such as a diode or a diode array or one or more avalanche photo diodes (APDs).

Figure 4A:
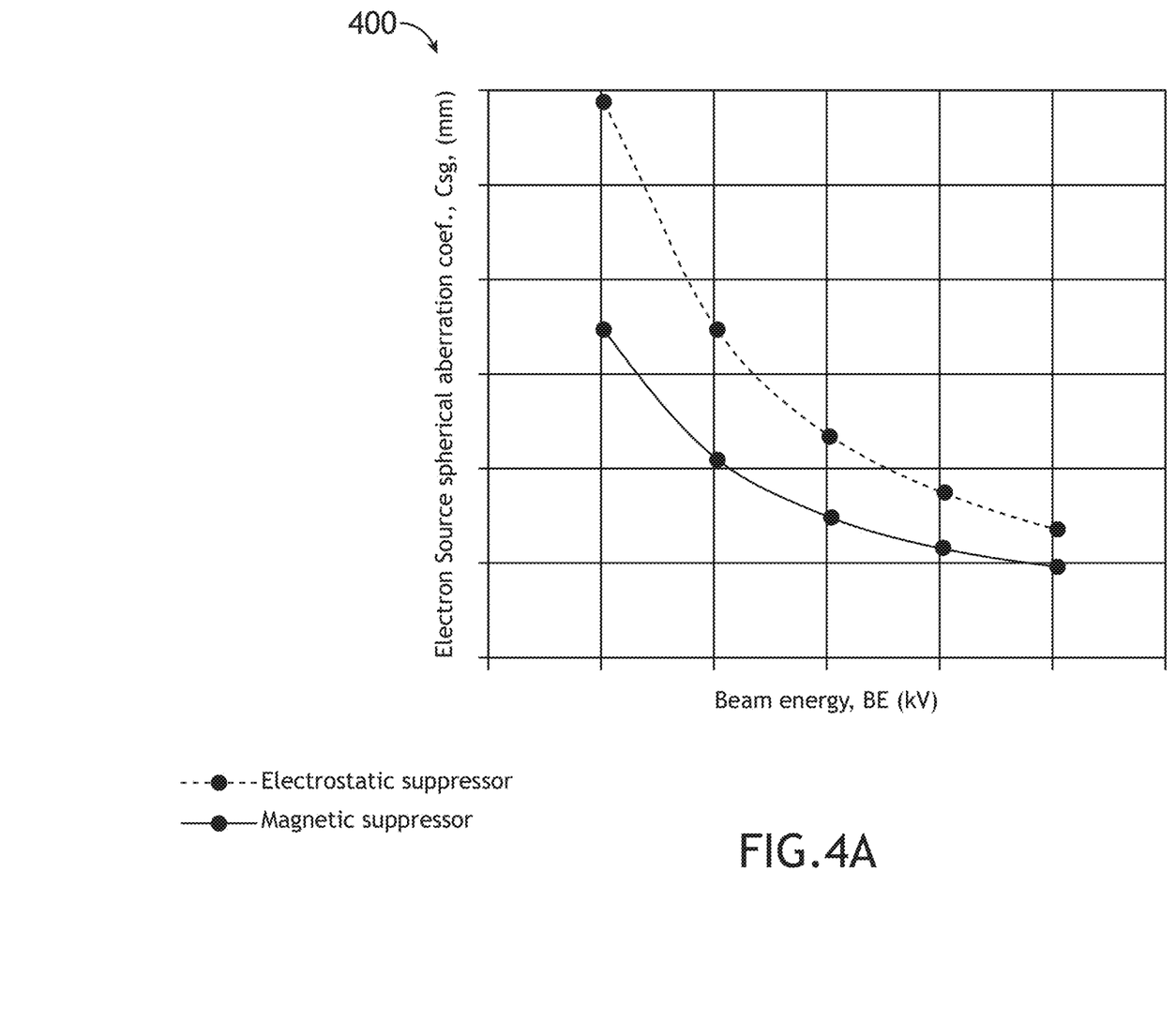
FIG. 4A illustrates a plot of spherical aberration coefficients for an electrostatic suppressor and a magnetic suppressor, in accordance with one or more embodiments of the present disclosure.
Figure 4B:
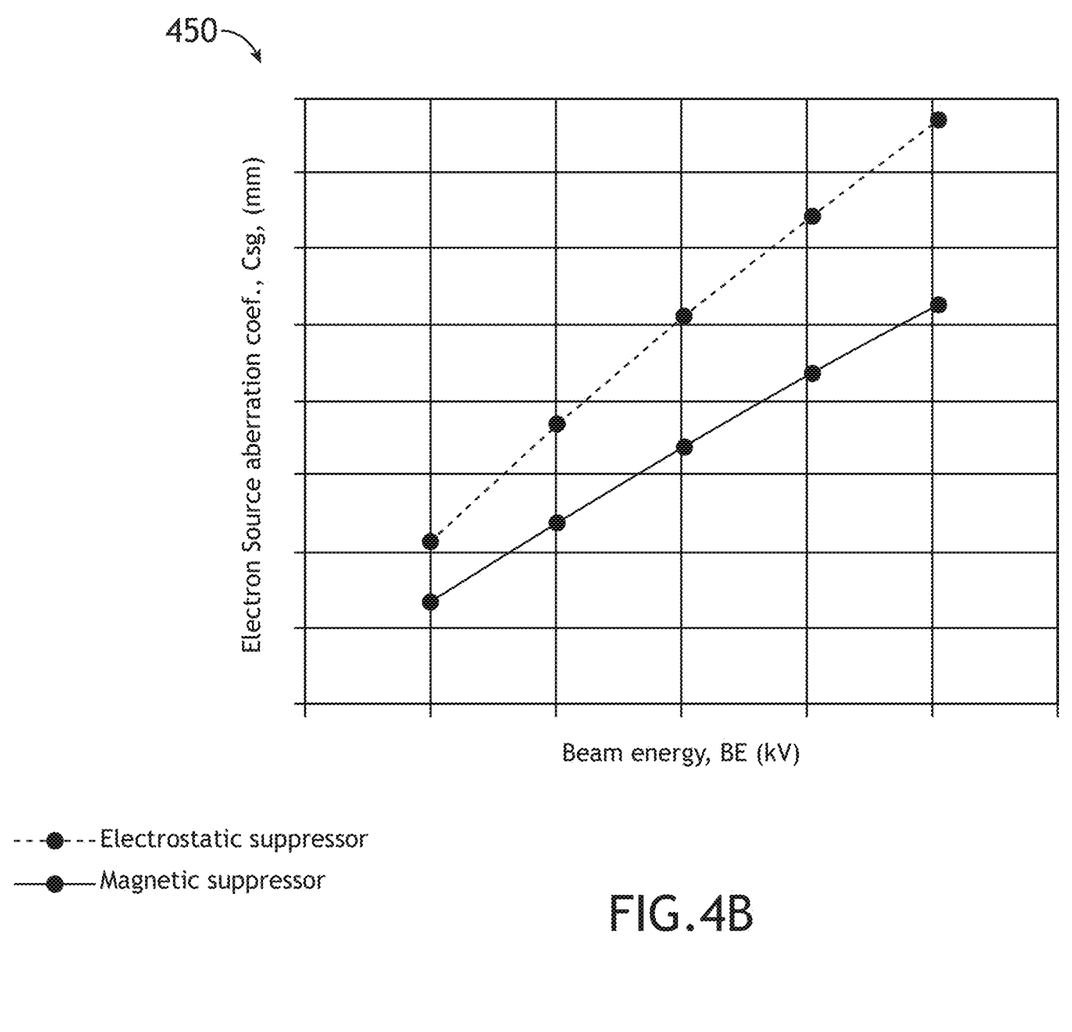
FIG. 4B illustrates a plot of chromatic aberration coefficients for an electrostatic suppressor and a magnetic suppressor, in accordance with one or more embodiments of the present disclosure.

FIGS. 4A-4B illustrate plots 400, 450 of spherical and chromatic aberration coefficients ($C_{sg}$, $C_{cg}$) for the tip-side of a magnetic lens for an electrostatic suppressor and a magnetic suppressor, in accordance with one or more embodiments of the present disclosure. In particular, FIG. 4A illustrates a plot 400 of spherical aberration coefficients ($C_{sg}$) for the tip-side of the magnetic lens. In particular, FIG. 4B illustrates a plot 450 of chromatic aberration coefficients ($C_{cg}$) for the tip-side of the magnetic lens.

Referring to FIG. 4A, the spherical aberration coefficient for the magnetic suppressor electrode of the electron source 100 is lower than the spherical aberration coefficient for an electrostatic suppressor electrode in a conventional electron source.

Referring to FIG. 4B, the chromatic aberration coefficient for the magnetic suppressor electrode of the electron source 100 is lower than the chromatic aberration coefficient for an electrostatic suppressor electrode in a conventional electron source.

The total spherical ($C_{stot}$) and chromatic ($C_{ctot}$) aberrations (Equation 1 and Equation 2, respectively) at the sample depend on the contributions from the electron source (e.g., the spherical and chromatic aberration coefficients, $C_{sg}$ and $C_{cg}$, respectively).

The total spherical ($C_{stot}$) and chromatic ($C_{ctot}$) aberrations may be shown and described by Equation 1 and Equation 2, respectively:

$$C_{stot} = C_{sOL} + M^4 C_{sg} \left(\frac{V_{LE}}{V_{EXT}}\right)^{3/2} \qquad \text{Equation 1}$$

$$C_{ctot} = C_{cOL} + M^2 C_{cg} \left(\frac{V_{LE}}{V_{EXT}}\right)^{3/2} \qquad \text{Equation 2}$$

In Equations 1-2, M is the optical magnification of a complete electron optical column (from tip to wafer); $V_{LE}$ is the landing energy voltage; $V_{EXT}$ is the extractor voltage, $C_{sOL}$, $C_{cOL}$ are the objective lens (OL) spherical and chromatic aberration coefficients in image-side (wafer-side), respectively; and $C_{stot}$, $C_{ctot}$ are the total spherical and chromatic aberration coefficients in the wafer, respectively.

It is noted herein that for higher beam current with larger optical magnification (M), the electron source $C_{sg}$ and $C_{cg}$ play more strongly in impacting resolution of the system.

Although FIG. 2 illustrates a single beam electron beam inspection system 200, it is noted herein that the electron beam inspection system 200 may include a multi-beam inspection system 200 including an array of electron sources 100. In a multi-beam system, the magnetic suppressor electrode 106 may be configured to improve the resolution through the low spherical and chromatic aberration coefficients in a system with large number apertures. Further, in a multi-beam system, the magnetic suppressor electrode 106 may be configured to improve the resolution with smaller beam limiting apertures having higher beam current densities.

In some embodiments, the electron source 100 is a cold field emission (CFE) electron source. In this regard, the electron source 100 may have larger optical magnification (M) than a thermal field emission-based (TFE-based) electron source. For example, the CFE electron source may have a 2-4 times larger optical magnification due to the electron source angular intensity (Ja) being 5-10 times lower than those in the TFE-based electron source.

Figure 5:
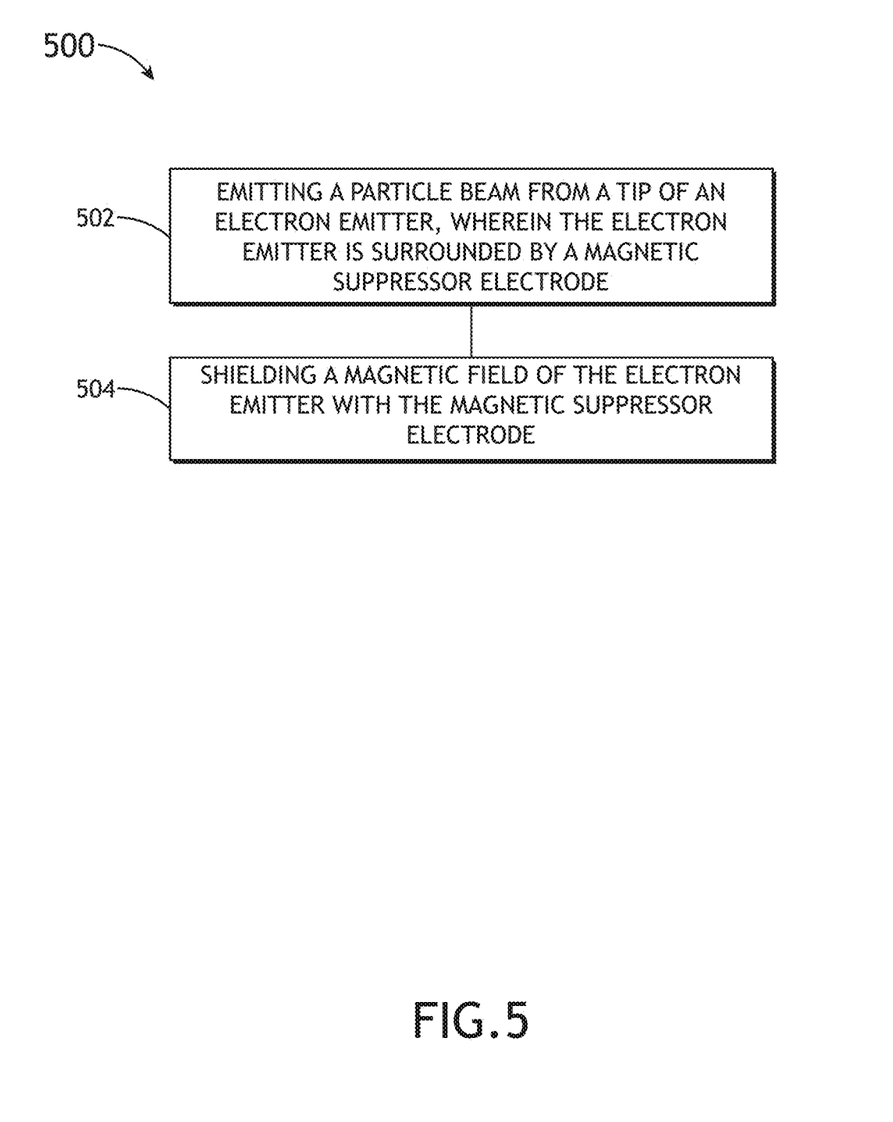
FIG. 5 illustrates a process flow diagram depicting a method for the electron source, in accordance with one or more embodiments of the present disclosure.

FIG. 5 is a process flow diagram illustrating a method 500 of implementing a magnetic electron source 100, in accordance with one or more embodiments of the present disclosure. It is noted herein that the various embodiments, components, and architecture described previously herein in FIGS. 1 through 4 should be interpreted to extend to the method 500 of FIG. 5.

In step 502, a particle beam from a tip 104 of an electron emitter 102 is emitted by the electron source 100. For example, the electron emitter 102 of the electron source 100 may be configured to emit a particle beam 101 from the tip 104 of the emitter 102.

The particle emission from the tip 104 of the electron emitter 102 may include any type of emission process known in the art. For example, the particle emission may include at least one of thermal electron emission, Schottky electron emission, extended-Schottky electron emission, cold field electron emission, photoemission, or the like.

In step 504, a magnetic field of the electron emitter 102 may be shielded. For example, the magnetic suppressor electrode 106 may be configured to shield the magnetic field of the electron emitter 102. For instance, as shown in FIG. 6, the magnetic suppressor electrode 106 may be configured to shield the filament of the tip 104 of the electron emitter.

Figure 6A:
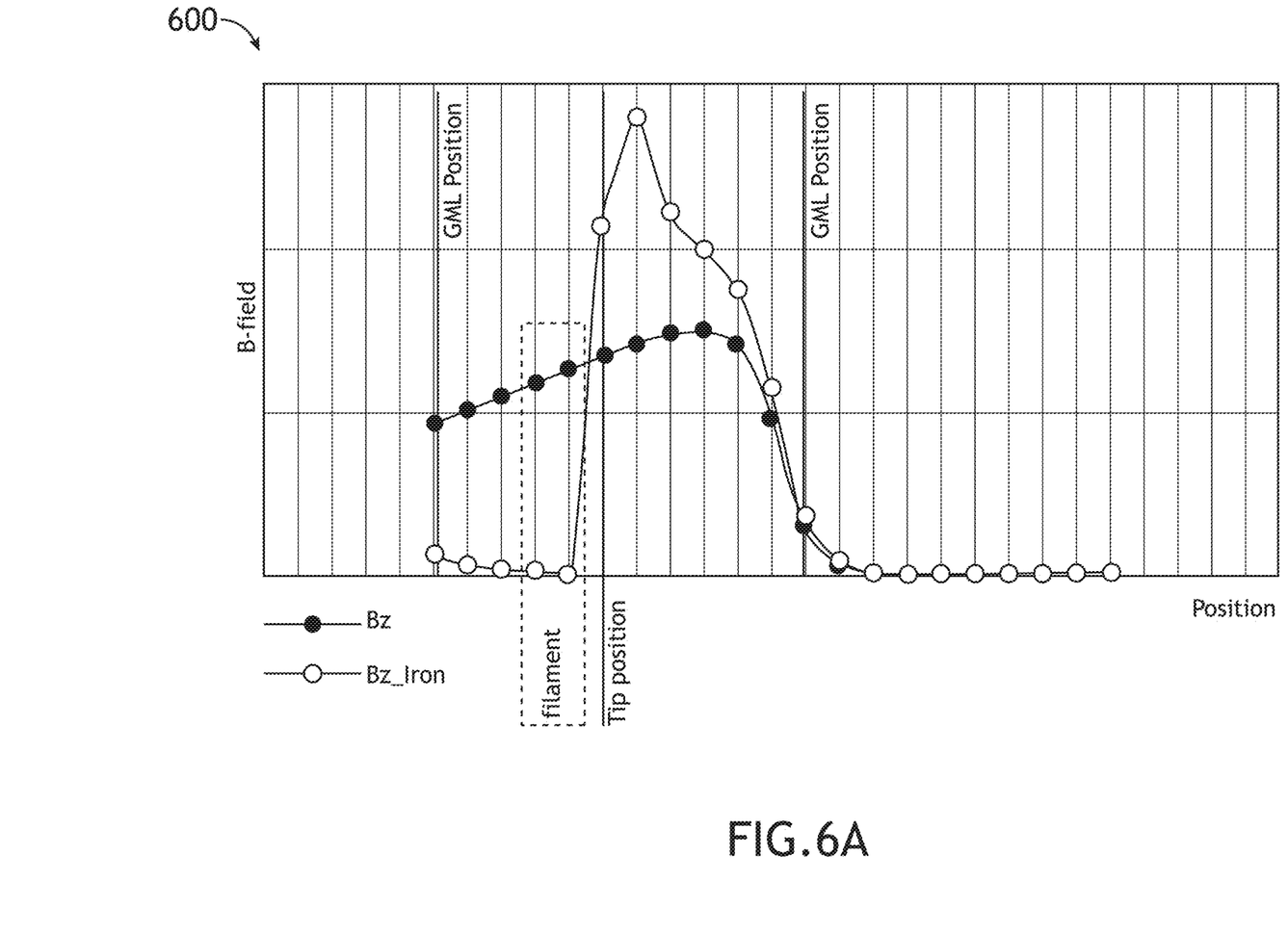
FIG. 6A illustrates a plot of filament shielding with a magnetic suppressor electrode of the electron source, in accordance with one or more embodiments of the present disclosure.
Figure 6B:
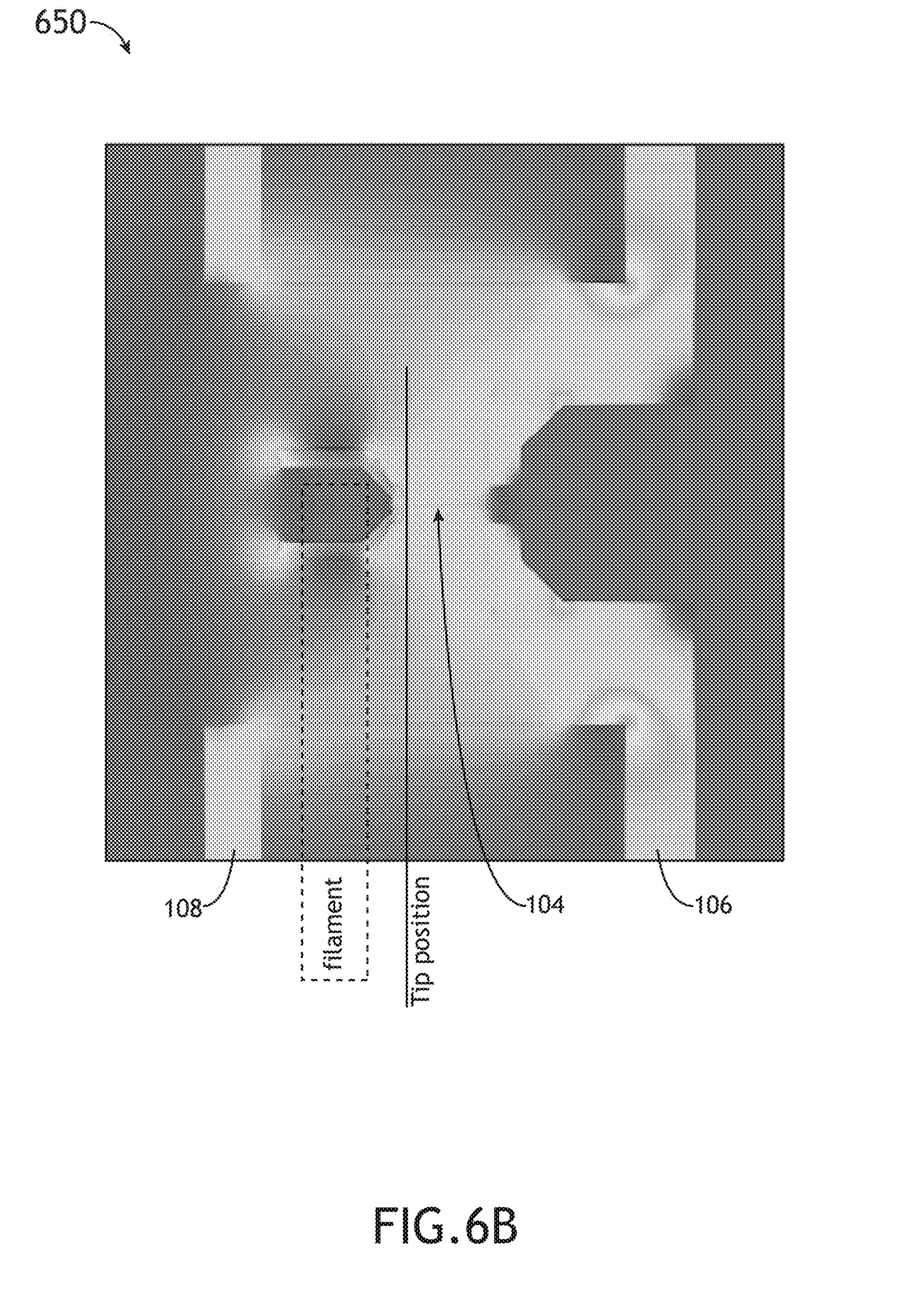
FIG. 6B illustrates a flux density map of the electron source, in accordance with one or more embodiments of the present disclosure.

FIG. 6A illustrates a plot 600 of filament shielding with the magnetic suppressor electrode 106 of the electron source 100, in accordance with one or more embodiments of the present disclosure. FIG. 6B illustrates a flux density map 650 of the electron source 100, in accordance with one or more embodiments of the present disclosure.

The magnetic suppressor electrode may be configured to shield at least a portion of the emitter 102 (e.g., the tip) with the magnetic material of the magnetic suppressor electrode. For example, as shown in FIG. 6A, the magnetic suppressor electrode 106 may be formed of Iron (Fe) and the magnetic material (e.g., Iron) of the magnetic suppressor electrode 106 may be configured to shield the tip 104 of the electron emitter 102. Referring to FIG. 6B, the flux density may be the highest near or around the tip 104. In this regard, the shaft of the tip 104 is being shield from the axial magnetic field with the magnetic suppressor electrode.

It is noted herein that by shielding the filament of the tip 104 (e.g., cancelling out the magnetic field), the current and axial magnetic field are isolated from each other and no resulting force results. Therefore, there is no creeping or displacement and calibration is only needed initially, which reduces maintenance time. Further, the lifetime of the electron source is extended.

It is contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed is:

1. An electron source, comprising:
    an electron emitter configured to generate one or more electron beams;
    a stand-alone magnetic suppressor electrode surrounding at least a portion of the electron emitter, wherein the magnetic suppressor electrode is formed from one or more magnetic materials, wherein the magnetic suppressor electrode includes a conical section that surrounds the electron emitter, wherein the magnetic suppressor electrode is configured to shield the shaft of the tip of electron emitter from the axial magnetic field from a magnetic lens thereby mitigating drift of the electron emitter; and
    an extractor electrode positioned adjacent to a tip of the electron emitter.

2. The electron source of claim 1, wherein the magnetic suppressor electrode is formed from one or more ferromagnetic materials.

3. The electron source of claim 2, wherein the one or more ferromagnetic materials include a magnetic material including at least one of:
    nickel, iron, or cobalt.

4. An electron beam inspection system, comprising:
    an electron source comprising:
        an electron emitter configured to generate one or more electron beams;
        a stand-alone magnetic suppressor electrode surrounding at least a portion of the electron emitter, wherein the magnetic suppressor electrode is formed from one or more magnetic materials, wherein the magnetic suppressor electrode includes a conical section that surrounds the electron emitter, wherein the magnetic suppressor electrode is configured to shield the shaft of the tip of electron emitter from the axial magnetic field from a magnetic lens thereby mitigating drift of the electron emitter; and
        an extractor electrode positioned adjacent to a tip of the electron emitter;
    an electron-optical column including a set of electron-optical elements configured to direct the electron beam onto a sample, the set of electron-optical elements including at least the magnetic lens.

5. The electron beam inspection system of claim 4, wherein a working distance of the magnetic lens is between 2-8 mm.

6. The electron beam inspection system of claim 5, wherein the a working distance of the magnetic lens is 5 mm.

7. The electron beam inspection system of claim 4, wherein the magnetic suppressor electrode is configured to narrow a working distance of the magnetic lens.

8. The electron beam inspection system of claim 4, wherein the magnetic suppressor electrode is formed from one or more ferromagnetic materials.

9. The electron beam inspection system of claim 8, wherein the one or more ferromagnetic materials includes one or more magnetic materials including at least one of:
    nickel, iron, or cobalt.

10. A method, comprising:
    emitting a particle beam from a tip of an electron emitter, wherein the electron emitter is at least partially surrounded by a stand-alone magnetic suppressor electrode, wherein the magnetic suppressor electrode includes a conical section that surrounds the electron emitter; and shielding a shaft of a tip of the electron emitter from an axial magnetic field from a magnetic lens thereby mitigating drift of the electron emitter; and compressing a magnetic field of the magnetic lens toward the electron emitter to reduce the working distance of the magnetic lens below 10 mm to correct spherical and chromatic aberrations and limit EMI-induced vibration of the emitter.

11. The method of claim 10, wherein the magnetic suppressor electrode is formed from one or more ferromagnetic materials.

12. The method of claim 11, wherein the one or more ferromagnetic materials includes a magnetic material including at least one of:

nickel, iron, or cobalt.

\* \* \* \* \*